(12) United States Patent
Sturms et al.

(10) Patent No.: US 6,789,085 B2
(45) Date of Patent: Sep. 7, 2004

(54) SYSTEM AND METHOD FOR MAINTAINING A USER'S STATE WITHIN A DATABASE TABLE AND FOR ACCOMMODATING NULL VALUES

(75) Inventors: James M. Sturms, Seattle, WA (US); Nicholas A. J. Millington, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 299 days.

(21) Appl. No.: 09/876,474

(22) Filed: Jun. 7, 2001

(65) Prior Publication Data

US 2002/0107831 A1 Aug. 8, 2002

Related U.S. Application Data

(63) Continuation-in-part of application No. 09/602,410, filed on Jun. 23, 2000.

(51) Int. Cl.[7] .............................................. G06F 17/30
(52) U.S. Cl. .............................. 707/102; 707/2; 707/3; 707/10; 707/101; 707/103; 707/104
(58) Field of Search .............................. 703/2, 3, 101, 703/103; 709/217, 224; 707/2, 3, 9, 10, 103, 4, 5, 101, 102, 104

(56) References Cited

U.S. PATENT DOCUMENTS

| | | | | |
|---|---|---|---|---|
| 5,499,368 A | * | 3/1996 | Tate et al. ...................... | 707/4 |
| 5,590,324 A | * | 12/1996 | Leung et al. .................. | 707/5 |
| 5,630,127 A | * | 5/1997 | Moore et al. ........... | 707/103 R |

(List continued on next page.)

OTHER PUBLICATIONS

*Webvise: Browser and Proxy Support for Open Hypermedia Structuring Mechanisms on the WorldWide Web*; K. Gronbaek, L. Sloth and P. Orbaek; Computer Networks Conference, Comput. Netw. (Neherlands) vol. 31, No. 11–16; (May 1999); pp. 1331–1345.

*A Day in the Life of a Public Terminal–A Transaction Analysis of an Online Catalogue Terminal in a Bilingual Environment*; D. Holmes and D. Bulger; Canadian Journal of Information Science vol. 13 No. 3–4; (Dec. 1988); pp. 21–33.

*Stateful Relational Database Gateways for the World Wide Web*; S. Hadjiefthymiades, D. Martakos and C. Petrou; Journal of Systems and Software vol. 48, No. 3; 1999; pp. 177–187.

(List continued on next page.)

Primary Examiner—Thuy N. Pardo
(74) Attorney, Agent, or Firm—Merchant & Gould

(57) ABSTRACT

A system and method are provided for delivering batches of data to a client, while maintaining the client's state in the accessed database. The system and method eliminate the need for a web server to maintain the location of any given client within a database. Accordingly, the web server operates with greater efficiency, because it is freed from having to maintain the state of any given client within a database and need not create or maintain a partitioned database. Maximum and minimum values of any data previously requested and received by the client are maintained. These maximum and minimum values are later used within a novel set of Structured Query Language (SQL) statements to indicate the user's state within the database. By maintaining minimum and maximum reference values, the user's state within the accessed database can be maintained without storing any information on the web server. The next and previous batches are successfully obtained by comparing these stored reference values to the database so that the user can quickly move between adjacent batches of records. The invention provides a simple and elegant means for maintaining a user's state within a database, without requiring the use of a web server's resources or the creation of a partitioned database.

33 Claims, 14 Drawing Sheets

U.S. PATENT DOCUMENTS

| | | | | |
|---|---|---|---|---|
| 5,819,256 A | * | 10/1998 | Ozbutun et al. | 707/2 |
| 5,899,993 A | * | 5/1999 | Jenkins, Jr. | 707/9 |
| 6,088,698 A | * | 7/2000 | Lipkin | 707/10 |
| 6,112,210 A | * | 8/2000 | Nori et al. | 707/103 R |
| 6,163,780 A | * | 12/2000 | Ross | 707/101 |
| 6,496,819 B1 | * | 12/2002 | Bello et al. | 707/3 |

OTHER PUBLICATIONS

*Using Agents for Secure Access to Data in the Internet*; Z. Tari; *IEEE Communications Magazine* vol. 35, No. 6; 1997; pp. 136–140.

*Interoperability and Interchangeability of Middleware Components in a Three–Tier CORBAEnvironment–State of the Art*; M. Aleksy; M. Schader and C. Tapper; *Proceedings Third International Enterprise Distributed Object Computing*1999; pages vi–279.

*Internet Software Engineering: Design and Implementation of Interactive Web Applications*; K. M. Goschka; *International Society for Computers and Their Applications; 13th International Conference and Their Applications*1998; pp. 5–8.

*Highlights of the Online Database Industry and the Internet 1997*, M. E. Williams; *National Online Meeting Proceedings 1997; Proceedings of the 18th National Online Meeting* 1997; pp. 1–6.

*Accessing Corporate Data from the Web*; S. Mazingo; *Digital Systems Report* vol. 18, No. 5; 1996; pp. 27–29.

*Spider 1.5 [Software Review]*; K. Indermaur; *DBMS* vol. 9, No. 8; (Jul. 1996); pp. 38, 67.

\* cited by examiner

TABLE: MyList

| | Title | ID |
|---|---|---|
| 250 | | |
| 252 | Ulysses | 100 |
| 254 | The Great Gatsby | 100 |
| 258 | Brave New World | 102 |
| 260 | Catch-22 | 104 |
| 262 | The Grapes of Wrath | 101 |
| 264 | Sons and Lovers | 105 |
| 266 | The Grapes of Wrath | 106 |
| 268 | The Grapes of Wrath | 105 |
| 270 | I, Claudius | 107 |
| 272 | An American Tragedy | 108 |
| 274 | Slaughterhouse Five | 109 |
| 276 | Invisible Man | 110 |
| 278 | Animal Farm | 111 |
| 280 | As I Lay Dying | 112 |
| 282 | Tropic of Cancer | 113 |
| 284 | On the Road | 114 |
| 286 | On the Road | 115 |
| 288 | On the Road | 116 |
| | On the Road | 117 |

```
SELECT TOP 20 * FROM MyList
ORDER BY MyList.Title, MyList.ID
```

400
402

```
500  SELECT TOP 20 * FROM MyList
504  WHERE
506      (MyList.Title IS NOT Null)
508      OR
510      (MyList.Title IS NULL AND
             MyList.ID > Current_Maximum_ID)
512  ORDER BY MyList.Title, MyList.ID
```

*Fig. 5a*

```
SELECT TOP 20 * FROM MyList
WHERE
    (MyList.Title > Current_Maximum_Title)
    OR
    (MyList.Title = Current_Maximum_Title AND
        MyList.ID > Current_Maximum_ID)
ORDER BY MyList.Title, MyList.ID
```

```
550   SELECT TOP 20 * FROM MyList
554   WHERE
556       (MyList.Title < NULL)
558       OR
560       (MyList.Title IS NULL AND
562        MyList.ID < Current_Minimum_ID)
564   ORDER BY MyList.Title DESC, MyList.ID DESC
```

*Fig. 5c*

```
570  SELECT TOP 20 * FROM MyList
574    WHERE
576      (MyList.Title < Current_Minimum_Title)
           OR
578      (MyList.Title = Current_Minimum_Title AND
580       MyList.ID < Current_Minimum_ID)
582    ORDER BY MyList.Title DESC, MyList.ID DESC
```

*Fig. 5d*

600 SELECT * FROM
602 (SELECT TOP 20 * FROM MyList
604 WHERE
606   (MyList.Title < NULL)
608   OR
610   (MyList.Title IS NULL AND
         MyList.ID < Current_Minimum_ID)
612 ORDER BY MyList.Title DESC, MyList.ID DESC)
614 ORDER BY MyList.Title, MyList.ID

*Fig. 6a*

```
630  SELECT * FROM
632    (SELECT TOP 20 * FROM MyList
634    WHERE
636      (MyList.Title < Current_Minimum_Title)
638      OR
640      (MyList.Title = Current_Minimum_Title AND
              MyList.ID < Current_Minimum_ID)
642    ORDER BY MyList.Title DESC, MyList.ID DESC)
644  ORDER BY MyList.Title, MyList.ID
```

*Fig. 6b*

```
650  SELECT * FROM
652      (SELECT TOP 20 * FROM MyList
654      WHERE
656          (MyList.Title IS NOT NULL)
658          OR
660          (MyList.Title IS NULL AND
                MyList.ID > Current_Maximum_ID)
662      ORDER BY MyList.Title, MyList.ID)
664  ORDER BY MyList.Title DESC, MyList.ID DESC
```

*Fig. 6c*

```
670  SELECT * FROM
672    (SELECT TOP 20 * FROM MyList
674     WHERE
676       (MyList.Title > Current_Maximum_Title)
678       OR
680       (MyList.Title = Current_Maximum_Title AND
            MyList.ID > Current_Maximum_ID)
682     ORDER BY MyList.Title, MyList.ID)
684  ORDER BY MyList.Title DESC, MyList.ID DESC
```

*Fig. 6d*

SYSTEM AND METHOD FOR MAINTAINING A USER'S STATE WITHIN A DATABASE TABLE AND FOR ACCOMMODATING NULL VALUES

RELATED APPLICATIONS

This application is a continuation-in-part of U.S. Ser. No. 09/602,410, filed Jun. 23, 2000, and entitled "System and Method for Maintaining a User's State Within a Database Table."

TECHNICAL FIELD

The present invention relates to a system and method for managing a database table, and more particularly relates to a system and method for using a specialized query format to maintain a record of a user's state within the database table and to accommodate for null values within the table.

BACKGROUND OF THE INVENTION

One of the primary benefits provided by the Internet is widespread access to data maintained by data providers in centralized databases. For example, a wholesaler of retail goods may provide retail outlets access to its inventory database or a public library may provide borrowers access to its online card catalog. Users at the retail outlets can access the database to determine product attributes such as product descriptions, product availability, and product pricing. Library borrowers could determine the availability of books. Such databases can be very large, which presents obstacles to effective data distribution. With large databases, a policy decision must be made by the data provider as to how to deliver data to the user over the Internet.

One approach to providing data to a user is by allowing the user to download the entire contents of the database to the user's local computer. However, this approach has various problems. One problem is that the user must have system resources capable of processing the large database with acceptable performance. Some large databases are simply too large to permit the user to use the database with ease and efficiency and may ultimately deter users from exploiting the benefits of the database. Another problem with this approach is that the user may not have a tool for effectively browsing the database after it has been downloaded. In this case, the database becomes a burdensome and unwieldy mass of data reducing its usefulness to the user.

Another common approach is to deliver the data to the user in batches. With this approach, the data provider will partition the data into batches and deliver the batches, one at a time, to the end user. The end user is, thus, provided with a manageable portion of the database. Maintaining a partitioned database can be difficult in applications where the database must be regularly updated or modified. Moreover, in order to permit the user to browse between adjacent batches, the data provider must maintain a record as to which batch the user has accessed. This approach also requires that the data provider maintain records of each user's activity with respect to the database. That is, the data provider must maintain a record of the user's "state" or location within the database.

There is a need in the art for a means for providing users with remote access (e.g., via the Internet) that is more efficient and more effective than the above-described existing approaches. The system should provide good end-user performance by delivering batches (i.e., partial data sets) to a user and should provide good server performance by eliminating the necessity to maintain partitioned databases and/or state information on the user. The system should also be capable of being implemented without significant modifications of existing databases and should be able to accommodate null values found in the records of existing databases.

SUMMARY OF THE INVENTION

The present invention solves the problems of the prior art by providing a system and method for delivering batches of data to a client, while maintaining the client's state in the accessed database. The system and method eliminates the need for a web server to maintain the location of any given client within a database. Accordingly, the web server operates with greater efficiency, because it is freed from having to maintain the state of any given client within a database and need not create or maintain partitioned databases.

The typical Internet database searching arrangement involves a database server, a web server and an end user's computer (client computer). The database server maintains the data to which the end user seeks access. The web server acts an intermediary and permits access to the database server's database via the internet. The end user's computer will be running an application, such as a web browser, which will permit the end user to communicate with the web server and query the database on the database server.

The present invention enables a web server to deliver to the client computer a web site with a query entry field. The end user can enter a query in the field and submit the query to the web server. The web server will, in turn, access the database server and return a first batch of records satisfying the search to the end user. The first batch can be configured with a "next" button that will allow the user to access the next group of records from the database. Once the user has received the next group of records from the database, the user will also be provided with a "previous" button by which the user may access the adjacent, previously delivered batch of records.

The present invention accomplishes batch fetching by implementing a novel Structured Query Language (SQL) statement. The SQL statements reference minimum and maximum reference values from previously received batched of records.

By maintaining minimum and maximum reference values on the client's computer, the user's state within the accessed database can be maintained without storing any information on the web server. The next and previous batches are successfully obtained by comparing these stored reference values to the database so that the user can quickly move between adjacent batches of records. Thus, the invention provides a simple and elegant solution to the identified problem.

The present invention is capable of accommodating null values found in the accessed database. Typically, null values are arbitrarily sorted within the defined sorting structure of SQL and other programming models because a null value by definition is neither greater than nor less than any other given value. Thus, the comparison step described above could fail to properly retrieve records that contain null values. As a result of this failure, the user might be unable to properly traverse the database. The present invention solves this problem by using a specialized "WHERE" clause in a query that specifically accommodates situations where the desired batch of records contains one or more null values, thereby providing for the retrieval of the proper batch of records.

The various aspects of the present invention may be more clearly understood and appreciated from a review of the following detailed description of the disclosed embodiments and by reference to the drawings and claims

BRIEF DESCRIPTION OF THE DRAWINGS

FIG. 2b is a block diagram depicting the primary components of an exemplary database table.

FIG. 4 is a pseudo-code listing of a Structured Query Language (SQL) statement for requesting a first batch of data from a database in an exemplary embodiment of the present invention.

FIG. 5a is a pseudo-code listing of an SQL statement for requesting a next batch of data from a database that is arranged in ascending order in an exemplary embodiment of the present invention wherein the maximum reference value is a null value.

FIG. 5b is a pseudo-code listing of an SQL statement for requesting a next batch of data from a database that is arranged in ascending order in an exemplary embodiment of the present invention, wherein the maximum reference value is not a null value.

FIG. 5c is a pseudo-code listing of an SQL statement for requesting a next batch of data from a database that is arranged in descending order in an exemplary embodiment of the present invention, wherein the minimum reference value is a null value.

FIG. 5d is a pseudo-code listing of an SQL statement for requesting a next batch of data from a database that is arranged in descending order in an exemplary embodiment of the present invention, wherein the minimum reference value is not a null value.

FIG. 6a is a pseudo-code listing of an SQL statement for requesting a previous batch of data from a database that is arranged in ascending order in an exemplary embodiment of the present invention, wherein the minimum reference value is a null value.

FIG. 6b is a pseudo-code listing of an SQL statement for requesting a previous batch of data from a database that is arranged in ascending order in an exemplary embodiment of the present invention, wherein the minimum reference value is not a null value.

FIG. 6c is a pseudo-code listing of an SQL statement for requesting a previous batch of data from a database that is arranged in descending order in an exemplary embodiment of the present invention, wherein the maximum reference value is a null value.

FIG. 6d is a pseudo-code listing of an SQL statement for requesting a previous batch of data from a database that is arranged in descending order in an exemplary embodiment of the present invention, wherein the maximum reference value is not a null value.

DETAILED DESCRIPTION

The present invention solves the problems of the prior art by providing a system and method for delivering batches of data to a client, while maintaining the client's state in the accessed database. The system and method eliminates the need for a web server to maintain the location of any given client within a database. Accordingly, the web server operates with greater efficiency, because it is freed from having to maintain the state of any given client within a database and need not create or maintain partitioned databases. The present invention also provides for the accommodation of any null values present in the database and thus allows the client to smoothly traverse the database.

In an exemplary embodiment of the present invention, maximum and minimum values of any data previously requested and received by the client are maintained. These maximum and minimum values are later used within a novel set of Structured Query Language (SQL) statements to indicate the user's state within the database. By maintaining minimum and maximum reference values on the user's computer, the user's state within the accessed database can be maintained without storing any information on the web server. The next and previous batches are successfully obtained by comparing these stored reference values to the database so that the user can quickly move between adjacent batches of records. Null values that are neither greater than nor less than the stored reference values are accounted for in the SQL statements. Thus, the invention provides a simple and elegant means for maintaining a user's state within a database, without requiring the use of a web server's resources or the creation of partitioned databases.

An Exemplary Operating Environment

Figure 1:
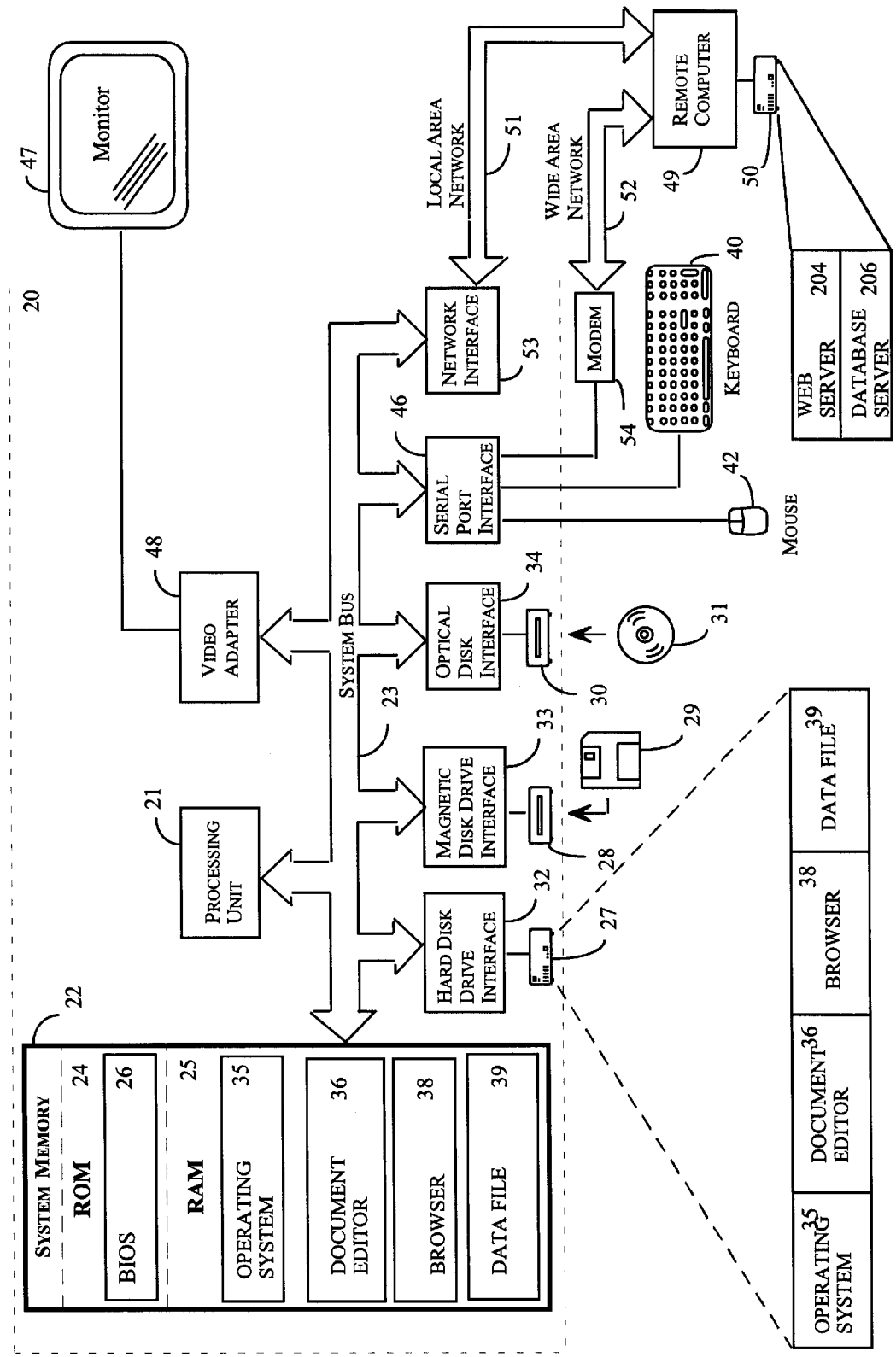
FIG. 1 is a block diagram of a computer system that provides the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more document editors 36, an Internet browser 38, and any number of other program modules, such as a data file 39 which could be maintained by document editor 36 or Internet browser 38 for storing, among other things, a user's preferences. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The memory storage device 50 may include stored program modules that are executable by the remote computer 49. For example, the memory storage device 50 may include web server functionality 204 or database server functionality 206. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

An exemplary embodiment of the present invention is represented by the "MICROSOFT INTERNET EXPLORER" and HTML source file editors including the "MICROSOFT WORD" word processing application program, the "MICROSOFT EXCEL" spreadsheet application program, the "MICROSOFT ACCESS" database application program, and the "MICROSOFT POWERPOINT" graphical presentation application program. However, it should be understood that the present invention can be implemented by various program modules and/or application programs for use with various operating systems.

An Exemplary Database Access Model

Figure 2A:
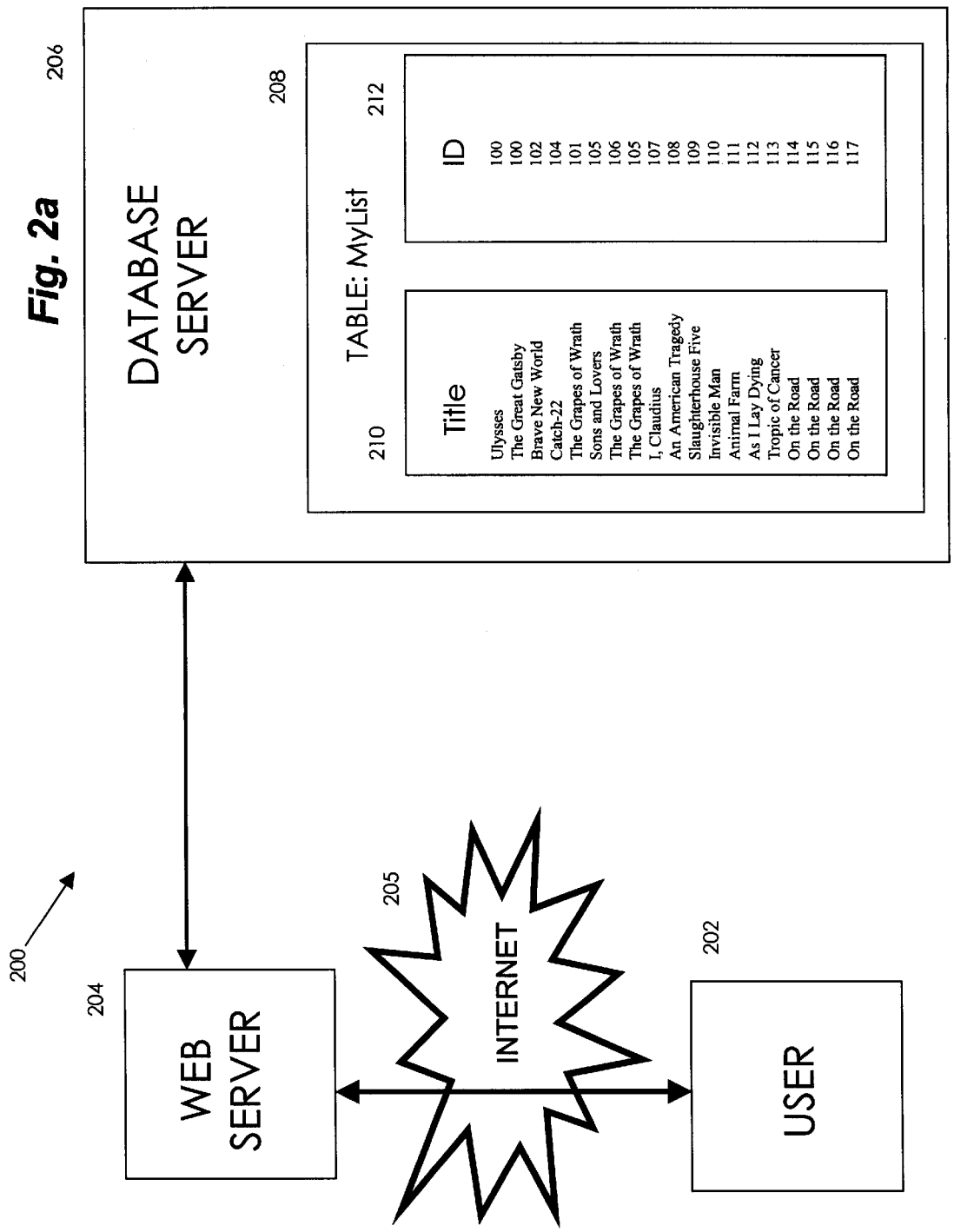
FIG. 2a is a block diagram depicting the primary components of an exemplary system for providing access to databases via the Internet.

FIG. 2a depicts a block diagram of an exemplary database access model. In this model, a user 202 can gain access to a table 208 (Table: MyList) stored on a database server 206. The user will typically access the database server 206 via a connection over the internet 205 to a web server 204. This model may be used by any entity providing access to data by remote or local users. For example, a public library may maintain a table of its inventory. In the example of FIG. 2a, the table is labeled "MyList" 208 and includes a list of two-field records including the title field 210 and the ID field 212. The public library could maintain the database server 206 and could provide access to remote users 202 via the web server 204. Turning now to FIG. 2b, Table: MyList 208 is shown with records 250–288. The title field of each record is associated with an ID field. For example, the title field containing the entry "Ulysses" is associated with ID number "100" and the title field containing "On the Road" of record 282 is associated with ID number "114". Notably, records 250, 252, 260, 262, 264, 266, 282, 284, 286 and 288 have duplicate title fields. However, because each of these records has at least one unique field with respect to all other records in the table, the records can be distinguished from one another. That is, each record sharing an ID field with another record has a distinct title. Each record sharing a title with another record has a distinct ID field. Because the title fields or ID fields of these records are different, however, these records are distinguishable from one another.

Figure 2C:
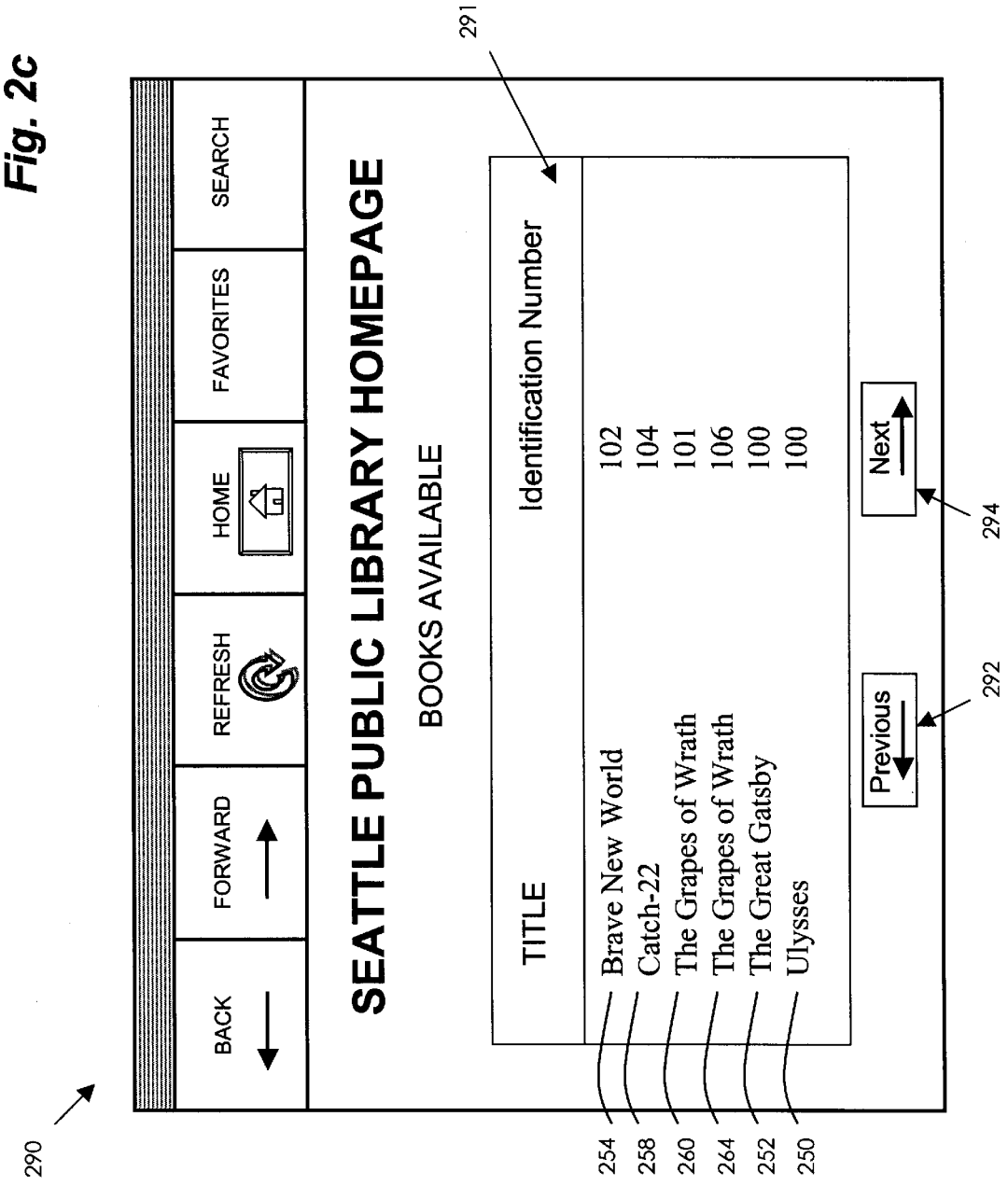
FIG. 2c is a block diagram depicting the primary components of an exemplary web page for providing access to databases via the Internet.

FIG. 2c depicts an exemplary web browser 290 that might be employed by a user 202. For the data access model 200 of FIG. 2a, a user 202 will typically utilize a browser running on a computer that is connected via the internet to the web server 204 (FIG. 2a). In FIG. 2c, the web server provides the user access to a web site that includes a data window 291. The data window 291 displays a batch of data contained in Table: MyList 208 to the user 202. The user can traverse the list by clicking on either the previous button 292 or the next button 294. The previous button 292 will show the records in the Table: MyList 208 that are ordered in Table: MyList before the current batch displayed in the data window 291. Similarly, the next button 294 will display the batch of data that is ordered after the batch of data currently displayed in the data window 291.

In the example of FIG. 2c, the records displayed in data window 291 are sorted in ascending alphabetical order of the value in the title field. That is, the title field of record 254 contains an entry ("Brave New World") that is "less than" the corresponding entry of record 258 ("Catch-22") in alphabetical order and is therefore displayed before record 258. In the case of records 260 and 264, which have identical title fields, the records are ordered by ID field in ascending order.

In an exemplary embodiment of the present invention, this ordering can be done locally on the user's computer. Of course, if the current batch (i.e., the batch represented in the data window 291) is the first batch of Table: MyList 208, the previous button 292 can be shaded to indicate its unavailability. The same applies for the last batch in Table: MyList 208, with respect to the next button 294.

An Exemplary Method for Traversing a Table

For the purposes of this discussion, the user's state is used to mean the user's position within the relevant table with respect to the other records in the table. For example, the records shown in the data window 291 of FIG. 2c represent the first batch in Table: MyList 208. That is, there are no records previous to this batch, but a next batch exists with respect to this batch.

Figure 3:
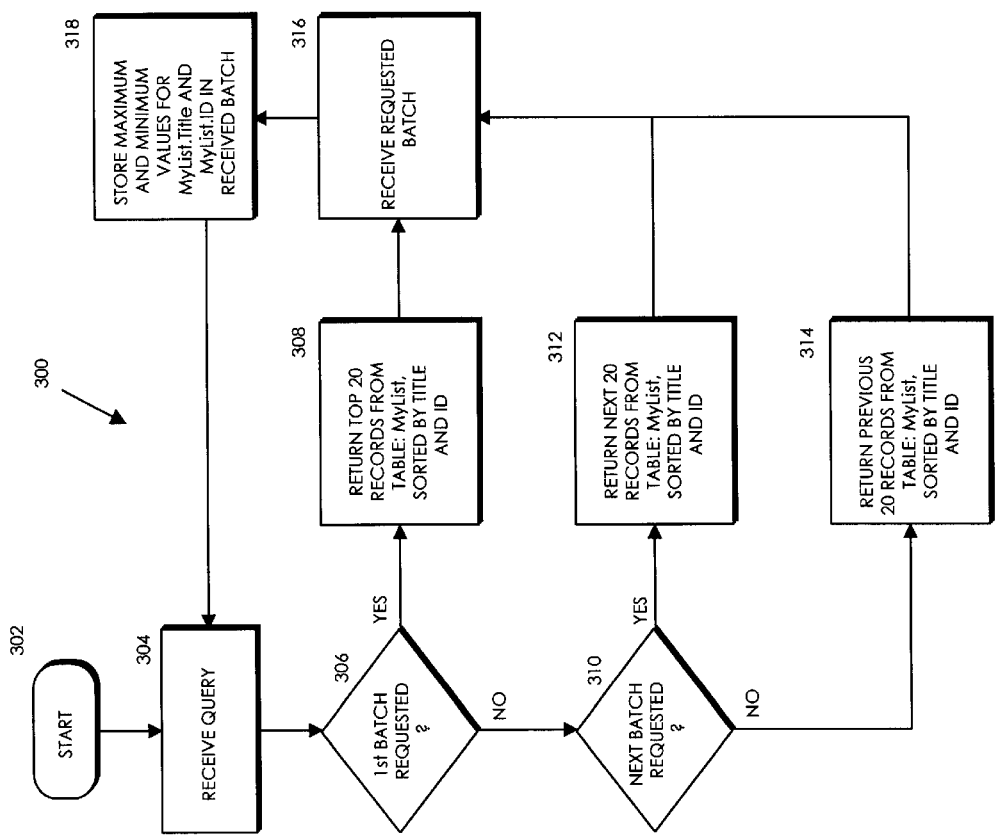
FIG. 3 is a flowchart depicting a method for maintaining a user's state within a database in an exemplary embodiment of the present invention.

Turning now to FIG. 3, an exemplary method for traversing Table: MyList 208 is depicted. The method 300 starts at step 302 and proceeds to step 304. At step 304, the web server 204 (FIG. 2a) receives a query from the user 202 (FIG. 2a). As described in connection with FIGS. 2a–c, the query can be of any form, but indicates to the web server 204 that the user 202 seeks access to a table within the database server 206. When the user first accesses the database server 206 through web server 204, the user must necessarily access a first batch of data. At decision block 306, a determination is made as to whether the data requested is the first batch of data. If the requested data is the first batch, the method branches to step 308.

The determination at step 308 need not be made by the web server 202. On the contrary, a novel set of batch request instructions can be used to differentiate a first batch request from a next or a previous batch request. That is, the batch request instructions identify different batches, so that the web server need not differentiate between these kinds of requests. In an exemplary embodiment of the present invention, a first batch request from a user 202 is different from a previous or next batch request so that the web server 204 need not recognize a first batch request, nor make a determination whether a batch request is a first, a next, or a previous batch request.

At step 308, the first twenty records from Table: MyList 208 are returned to the user and sorted by title and ID, as described in connection with FIG. 2c. Although the step indicates that the first twenty records are returned, any number of records could be returned.

Returning to decision block 306, if the requested batch is not the first batch, then the method branches to decision block 310. At 310 a determination is made as to whether the next batch records have been requested. As described above, the determination of step 310 can be made by the use of a novel set of request instructions and need not be made by the web server 202. As described in connection with FIG. 2c, the user can request the next batch of records by hitting the next button 294. If the requested batch is the next batch, then the method branches to step 312 and the next twenty records from Table: MyList is returned to the user. These records can be sorted by title and ID as described in connection with FIG. 2c.

Returning now to decision block 310, if a determination is made that the requested batch of records is not the next batch of records (i.e., the requested batch of records is the previous batch of records), then the method branches to step 314. At step 314 the previous twenty records from Table: MyList are returned to the user. As described above in connection with FIG. 2c, the user can request the previous batch of records by clicking on the previous button 292. As discussed above, the previous batch of records can be sorted by title and ID for presentation to the user.

The method branches from steps 308, 312 and 314 to step 316. At step 316, the user receives the requested batch. The method then proceeds to step 318. At step 318 the user's computer can store the maximum and minimum values contained in the title fields and ID fields of the received batch of records. Because the maximum and minimum values for these fields have been stored, a determination of which records in Table: MyList 208 are to be returned for the next or previous batches can be made quickly and efficiently. These maximum and minimum values can be stored by the user, by the web server, or by any other conventional storage means. In any case, each query from the user for a batch of records from the database server 206 subsequent to the first batch requested, can include these maximum and minimum values. By accessing these maximum and minimum values, the web server can quickly determine the requested batch of records without maintaining a record itself of the user's state within the Table: MyList 208.

After the maximum and minimum values for the title and ID fields have been stored, the method returns to step 304 and awaits a request from the user for another batch of records. FIGS. 4–6 provide a detailed discussion of an exemplary method for using the stored maximum and minimum values to facilitate a user's traversal of Table: MyList 208. FIG. 4 depicts pseudo-code representing the means by which an exemplary method of retrieving batches of records retrieves the first batch. The pseudo-code represented in FIGS. 4–6 are provided in standard structured query language (SQL) format. SQL is a database language used for creating, maintaining, and viewing database data. Queries in SQL format are well known to those skilled in the computer arts. Returning now to FIG. 4, line 400 is a SELECT clause that indicates that the query is requesting records from a table. In the case of line 400, the query is requesting twenty records from the table entitled (MyList). Because there are no conditions placed on the retrieved records, the first twenty records will be retrieved. Alternatively, the first 20 records could be specified by use of a "SET ROWCOUNT 20" statement, as is well known in the art. The asterisk specifies that all fields of the retrieved records should be retrieved. As is well known, any one or more fields of the records could be specified. Line 402 orders the returned batch of twenty records first by the title field and second by the ID field. As described in connection with FIG. 2c, where the title fields are identical, the identification number fields will be used to order the records in the returned batch.

Turning now to FIG. 5a, lines of pseudo-code are presented for fetching the next batch of records from Table: MyList 208 in the case where the Current_Maximum_Title stored is a null value. The pseudo-code presented in lines 500–512 may be applied when the records in the database are arranged in ascending alphabetical order such that the minimum value title is in the first row of the records and the maximum value title is in the last row of the records. Line 500 includes the SELECT statement described in FIG. 4. The asterisk specifies that all fields of the returned records should be retrieved. As mentioned above, the first 20 records could also be specified by use of a "SET ROWCOUNT 20" statement. Line 504 includes a WHERE clause which indicates that the query includes a condition that must be met by the retrieved batch of records. The WHERE clause shown in FIG. 5a is satisfied when the requirements of line 506 or 510 are met. The OR clause of line 508 indicates that either condition may be met to satisfy the WHERE clause.

The condition contained in line 506 is that the title field in any returned record is not a null value. Line 510 includes two subconditions that must both be met in order for the condition of line 510 to be met. The first subcondition in line 510 requires that the title of the next batch of records is equal to a null value. This subcondition is triggered when all of the title fields in the next batch of twenty records contain null values. In addition to the title field subcondition, line 510 includes a second subcondition that the ID field is greater than the Current_Maximum_ID stored. Line 512 includes an ORDER BY statement that returns the retrieved batch sorted by title and ID fields, as described above.

In effect, the line 506 first seeks records that do not include a null value in the title field. In the case where all of the titles in the next batch of twenty records are null, the condition of line 506 fails and the first subcondition of line 510 is met. The second subcondition of line 510 then selects the next batch of records by referencing the ID field. That is, the pseudo code of line 510 accesses the ID field and retrieves those records for which the ID field is greater than the Current_Maximum_ID stored. Obviously, the subcondition technique could be used to access records with any number of fields, by utilizing multiple subconditions. The system described operates correctly when there is some characteristic that distinguishes each record from all other records in the table such that the fields included in the ORDER BY clause collectively uniquely identify the row. That is, if the table contains two-field records having the same title and the same ID, then the system described will work less effectively.

FIG. 5b, like FIG. 5a, depicts pseudo code for returning the next batch of records in a database when the records are arranged in ascending alphabetical order. However, the pseudo-code in lines 530–540 of FIG. 5b applies when the Current_Maximum_Title stored is not a null value while the pseudo code in lines 500–512 of FIG. 5a applies when the Current_Maximum_Title stored is a null value. All of the lines 530–540 in FIG. 5b, except lines 534 and 538, contain the same pseudo code as lines 500–512 in FIG. 5a. The condition of line 534 seeks records that are greater than the Current_Maximum_Title stored. In the case where all of the titles in the next batch of twenty records are equivalent to the Current_Maximum_Title stored, the condition of line 534 fails and the first subcondition of line 538 is satisfied. The second subcondition of line 538 then selects the next batch of records by referencing the ID field and retrieving those records for which the ID field is greater than the Current_Maximum_ID stored.

Because the pseudo code presented in FIG. 5a and the pseudo code presented in FIG. 5b are applied in alternative situations, the two sets of pseudo code may be combined into one set of pseudo code by using an IF statement in place of line 506/534. The IF statement would determine whether to use the code in line 506 or the code in line 534, depending on whether the Current_Maximum_Title stored is or is not a null value.

FIG. 5c depicts an SQL query for returning a next batch of records in a database when the records in the database are arranged in descending order, such that the maximum value title is in the first row of the records and the minimum value title is in the last row of the records. The SELECT clause and the ORDER BY clause at steps 550 and 562, respectively, operate in the manner described in connection with FIG. 5a. At line 554, the SELECT clause indicates that twenty records are sought from Table: MyList. The ORDER BY clause at line 562 is different from the other ORDER BY clauses described above because it includes a DESC clause. The DESC clause requires that the records in the return batch are ordered in descending order and ensures that the next batch of records returned are immediately adjacent to the current batch of records.

The pseudo code in lines 550–564 is used when the Current_Minimum_Title stored is a null value. The conditions of the WHERE clause at line 554 are contained in lines 556 and 560. Line 556 first returns records that contain titles less than null. In the case where all of the title fields in the next batch of records contain null values, the condition of line 556 fails and the first subcondition of line 560 is met. The second subcondition of line 560 then selects the next batch of records by referencing the ID field. That is, the pseudo code of line 560 accesses the ID field and retrieves those records for which the ID field is less than the Current_Minimum_ID stored.

Turning now to FIG. 5d, lines 570–584 are identical to lines 550–564 of FIG. 5c, except for lines 576 (differs from line 556) and 580 (differs from line 560). The pseudo code of FIG. 5d also returns the next batch of records in a database in which the records are arranged in descending alphabetical order. The pseudo code of FIG. 5c applies when the Current_Minimum_Title stored is not a null value. The condition of line 576 first returns records with titles that are less than the Current_Minimum_Title stored. In the case where all of the titles in the next batch of twenty records are equivalent to the Current_Minimum_Title stored, the condition of line 576 fails and the first subcondition of line 580 is satisfied. The second subcondition of line 580 then selects the next batch of records by referencing the ID field and retrieving those records for which the ID field is less than the Current_Minimum ID_stored.

The two sets of pseudo code in FIG. 5c and FIG. 5d may be combined into one set of pseudo code by using an IF statement in place of line 556/576. The IF statement would determine whether to use the code in line 506 or the code in line 534, depending on whether the Current_Maximum_Title stored is or is not a null value.

FIG. 6a depicts a nested SQL query for returning a previous batch of records in a database when the records in the database are arranged in ascending alphabetical order. The pseudo code in lines 600–614 is used when the Current_Minimum_Title stored is a null value. The SELECT and ORDER BY clauses at lines 600 and 614, respectively, and the nested SELECT and ORDER BY clauses at lines 602 and 612, respectively, operate in the manner described in connection with FIG. 5c. The conditions of the WHERE clause at line 604 are contained in lines 606 and 610. The pseudo-code of line 606 first seeks records that have titles less than null. If all of the title fields in the next batch of records contain a null value, the condition of line 606 fails and the first subcondition of line 610 is satisfied. The second subcondition of line 610 then selects the next batch of records by referencing the ID field and retrieving those records for which the ID field is less than the Current_Minimum_ID stored.

FIG. 6b sets forth pseudo code for retrieving the previous batch of records from a database in which the records are arranged in descending alphabetical order in the case where the Current_Minimum_Title stored is not a null value. The only differences between the pseudo code in FIG. 6b and that in FIG. 6a may be found in lines 636 and 640. The pseudo-code in line 636 returns records that include titles less than the Current_Minimum_ID stored. In the case where all of the titles in the next batch of twenty records are equivalent to the Current_Minimum_Title stored, the condition of line 636 fails and the first subcondition of line 640 is satisfied. The second subcondition of line 640 then selects the next batch of records by referencing the ID field and retrieving those records for which the ID field is less than the Current_Minimum_ID stored.

The two sets of pseudo code in FIG. 6a and FIG. 6b may be combined into a single set of pseudo code by substituting an IF statement for line 606/636. The IF statement would determine whether to use the code in line 606 or the code in line 636, depending on whether the Current_Minimum_Title stored is or is not a null value.

FIGS. 6c and 6d depict pseudo code that retrieves the previous batch of records in a database in which the records are arranged in descending alphabetical order. The SELECT and ORDER BY clauses function the same as described above. Lines 650–664 in FIG. 6c are essentially the same as lines 670–684 in FIG. 6d with a few exceptions. Line 656 of FIG. 6c applies when the Current_Maximum_Title stored is a null value, whereas line 676 of FIG. 6d applies when the Current_Maximum_Title stored is not a null value. In particular, line 656 returns the records in a database that do not contain null values in the title field while line 676 returns records that have titles greater than the Current_Maximum_Title stored. In the case where the condition in line 656, or alternatively, line 676 is not met, the subcondition in line 660 is met when all of the titles in the next batch of twenty records are null, and the subcondition in line 680 is met when all of the titles in the next batch of twenty records equals the Current_Maximum_Title stored. The second subcondition of line 660, or alternatively, line 680 then selects the next batch of records by referencing the ID field and retrieving those records for which the ID field is greater than the Current_Maximum_ID stored.

The two sets of pseudo code in FIG. 6a and FIG. 6b may be combined into a single set of pseudo code by substituting an IF statement for line 656/676. Such an IF statement would determine whether to use the code in line 668 or the code in line 676, depending on whether the Current_Maximum_Title stored is or is not a null value.

In the embodiments described above, the title field and the ID field for each SQL query are arranged and sorted in the same order. They are either both arranged in ascending order or both arranged in descending order. However, this disclosure also contemplates embodiments in which the title field and the ID field are arranged and sorted in different orders, e.g., the title field may be arranged in ascending order and the ID field may be arranged in descending order or vice versa.

A person skilled in the art will appreciate that an SQL query can be tailored to accommodate various cases in which the database fields (e.g., Title field, ID field) are arranged and sorted in different orders (e.g., ascending and descending orders) within the database. For example, an ORDER BY clause operable for returning records arranged in descending order by a Title field and, when the Titles fields are identical, for returning the records arranged in ascending order by an ID field, can be constructed in the following form: "ORDER BY Title DESC, ID." Similarly, an ORDER BY clause for returning records arranged in ascending order by a Title field and, when the Titles fields are identical, for returning the records arranged in descending order by an ID field, can be constructed in the following form: "ORDER BY Title, ID DESC."

Also, the WHERE clause conditions can be modified, depending upon the sorting order for the Title field and the ID field. When retrieving the next batch of records in a database, ">Current_Max" should be used for ascending sorts of either the Title field or the ID field and "<Current_Min" should be used for descending sorts of either the Title field or the ID field. To retrieve the previous batch of records in a database, "<Current_Min" should be used for ascending sorts of either the Title field or the ID field and ">Current_Max" should be used for descending sorts of either the title field or the ID field. Those skilled in the art will appreciate that the use of the "Title field" and the "ID field" are for illustrative purposes only and that the present invention can be applied to any sortable database fields.

The present invention has been described in relation to particular embodiments that are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for maintaining a user's state within a database table, the method comprising the steps of:

receiving a request for a first batch of records from a database server;

retrieving the first batch of records from the database server;

determining a minimum value and a maximum value for at least one field in the first batch of records;

receiving a request for a second batch of records;

in response to a determination that the request for the second batch of records is a next request and that the second batch of records are arranged in ascending order, retrieving the second batch of records from the database server, wherein the second batch of records contains a value for the at least one field that is greater than the maximum value of the at least one field in the first batch of records;

in response to a determination that the request for the second batch of records is a next request and that the second batch of records are arranged in descending order, retrieving the second batch of records from the database server, wherein the second batch of records contains a value for the at least one field that is less than the minimum value of the at least one field in the first batch of records;

in response to a determination that the request for the second batch of records is a previous request and that the second batch of records are arranged in ascending order, retrieving the second batch of records from the database server, wherein the second batch of records contains a value for the at least one field that is less than the minimum value of the at least one field in the first batch of records;

in response to a determination that the request for the second batch of records is a previous request and that the second batch of records are arranged in descending order, retrieving the second batch of records from the database server, wherein the second batch of records contains a value for the at least one field that is greater than the maximum value of the at least one field in the first batch of records.

2. The method of claim 1, wherein the request for a second batch of records is a Structured Query Language (SQL) statement.

3. The method of claim 2, further comprising the step of storing the maximum value and the minimum value for inclusion in a subsequent request for a batch of records.

4. The method of claim 2, wherein the SQL statement has the form:

SELECT TOP 20*FROM Table
   WHERE
(Table.Field 1 IS NOT Null)
   OR
(Table.Field1 IS NULL AND Table.Field2>Current Maximum Field2)
   ORDER BY Table.Field1, Table.Field2; and wherein a Table clause represents the name of the database table, a Current Maximum Field1 represents a maximum value of a Field1 field in previously received records, a Current Maximum Field2 represents a maximum value of a Field2 field in previously received records.

5. The method of claim 2,
wherein the SQL statement has the form:
SELECT TOP 20*FROM Table
  WHERE
(Table.Field1>Current Maximum Field1)
  OR
(Table.Field1=Current Maximum Field1 AND Table.Field2>Current Maximum Field2)
  ORDER BY Table.Field1, Table.Field2; and
    wherein a Table clause represents the name of the database table, a Current Maximum Field1 represents a maximum value of a Field1 field in previously received records, a Current Maximum Field2 represents a maximum value of a Field2 field in previously received records.

6. The method of claim 2,
wherein the SQL statement has the form:
(SELECT TOP 20 FROM Table
  WHERE
(Table.Field1<NULL)
  OR
(Table.Field1 IS NULL AND Table.Field2<Current Minimum Field2)
ORDER BY Table.Field1 DESC, Table.Field2 DESC); and
    wherein a Table clause represents the name of the database table, a Current Maximum Field1 represents a maximum value of a Field1 field in previously received records, a Current Maximum Field2 represents a maximum value of a Field2 field in previously received records.

7. The method of claim 2,
wherein the SQL statement has the form:
(SELECT TOP 20*FROM Table
  WHERE
(Table.Field1<Current Minimum Field1)
  OR
(Table.Field1=Current Minimum Field1 AND Table.Field2<Current Minimum Field2)
ORDER BY Table.Field1 DESC, Table.Field2 DESC); and
    wherein a Table clause represents the name of the database table, a Current Maximum Field1 represents a maximum value of a Field1 field in previously received records, a Current Maximum Field2 represents a maximum value of a Field2 field in previously received records.

8. The method of claim 2,
wherein the SQL statement has the form:
SELECT*FROM
(SELECT TOP 20*FROM Table
  WHERE
(Table.Field1<Null)
  OR
(Table.Field1 IS NULL AND Table.Field2<Current Minimum Field2)
ORDER BY Table.Field1 DESC, Table.Field2 DESC)
ORDER BY Table.Field1, Table.Field2; and
    wherein a Table clause represents the name of the database table, a Current Minimum Field1 represents a minimum value of a Field1 field in previously received records, a Current Minimum Field2 represents a minimum value of a Field2 field in previously received records.

9. The method of claim 2,
wherein the SQL statement has the form:
SELECT*FROM
(SELECT TOP 20*FROM Table
  WHERE
(Table.Field1<Current Minimum Field1)
  OR
(Table.Field1 Current Minimum Field1 AND Table.Field2<Current Minimum Field2)
ORDER BY Table.Field1 DESC, Table.Field2 DESC)
ORDER BY Table.Field1, Table.Field2; and
    wherein a Table clause represents the name of the database table, a Current Minimum Field1 represents a minimum value of a Field1 field in previously received records, a Current Minimum Field2 represents a minimum value of a Field2 field in previously received records.

10. The method of claim 2,
wherein the SQL statement has the form:
SELECT*FROM
(SELECT TOP 20*FROM Table
  WHERE
(Table.Field1 IS NOT Null)
  OR
(Table.Field1 IS NULL AND
Table.Field2>Current Maximum Field2)
ORDER BY Table.Field1, Table.Field2)
ORDER BY Table.Field1 DESC, Table.Field2 DESC; and
    wherein a Table clause represents the name of the database table, a Current Minimum Field1 represents a minimum value of a Field1 field in previously received records, a Current Minimum Field2 represents a minimum value of a Field2 field in previously received records.

11. The method of claim 2,
wherein the SQL statement has the form:
SELECT*FROM
(SELECT TOP 20*FROM Table
  WHERE
(Table.Field1>Current Maximum Field1)
  OR
(Table.Field1=Current Maximum Field1 AND Table.Field2>Current Maximum Field2)
ORDER BY Table.Field1, Table.Field2)
ORDER BY Table.Field1 DESC, Table.Field2 DESC; and
    wherein a Table clause represents the name of the database table, a Current Minimum Field1 represents a minimum value of a Field1 field in previously received records, a Current Minimum Field2 represents a minimum value of a Field2 field in previously received records.

12. The method of claim 1, further comprising the step of providing the user with a previous button operative for initiating the request for a second batch of records.

13. The method of claim 1, further comprising the step of providing the user with a next button operative for initiating the request for a second batch of records.

14. A method for maintaining a user's state within a database table, the method comprising the steps of:
  receiving a request for a first batch of records from a database server;
  retrieving the first batch of records from the database server;
  determining a minimum value and a maximum value for a first field in the first batch of records;

determining a minimum value and a maximum value for a second field in the first batch of records;

receiving a request for a second batch of records;

in response to a determination that the request for the second batch of records is a next request and that the first field is arranged in ascending order and the second field is arranged in descending order, retrieving the second batch of records from the database server, wherein the second batch of records contains a first value in the first field that is greater than the maximum value for the first field in the first batch of records, or wherein the second batch of records contains a second value in the second field that is less than the minimum value for the second field in the first batch of records;

in response to a determination that the request for the second batch of records is a next request and that the first field is arranged in descending order and the second field is arranged in ascending order, retrieving the second batch of records from the database server, wherein the second batch of records contains a first value in the first field that is less than the minimum value for the first field in the first batch of records, or wherein the second batch of records contains a second value in the second field that is greater than the maximum value for the second field in the first batch of records;

in response to a determination that the request for the second batch of records is a previous request and that the first field is arranged in ascending order and the second field is arranged in descending order, retrieving the second batch of records from the database server, wherein the second batch of records contains a first value in the first field that is less than the minimum value for the first field in the first batch of records, or wherein the second batch of records contains a second value in the second field that is greater than the maximum value for the second field in the first batch of records; and in response to a determination that the request for the second batch of records is a previous request and that the first field is arranged in descending order and the second field is arranged in ascending order, retrieving the second batch of records from the database server, wherein the second batch of records contains a first value in the first field that is greater than the maximum value for the first field in the first batch of records, or wherein the second batch of records contains a second value in the second field that is less than the minimum value for the second field in the first batch of records.

15. The method of claim 14, wherein the request for a second batch of records is a Structured Query Language (SQL) statement.

16. The method of claim 14, further comprising the step of storing the maximum value and the minimum value for inclusion in a subsequent request for a batch of records.

17. The method of claim 14, wherein the first batch of records and the second batch of records comprise one or more fields in addition to the first and second fields, and further comprising:

determining a minimum value and a maximum value for the one or more fields in addition to the first and second fields; and retrieving the second batch of records based on the minimum and maximum values of the one or more fields when the values in the first field are equivalent and the values in the second field are equivalent.

18. A system for maintaining a user's state within a database table comprising:

a database server operative for maintaining a plurality of database records;

a client computer, operative for presenting a batch of database records to the user;

a web server operative for retrieving a batch of database records from the database server and for providing the batch of database records to the client computer and for accounting for null values within the batch of database records retrieved;

wherein the client computer is further operative for storing at least one field value contained in a retrieved batch of database records; and wherein the web server is further operative to determine which batch of records to be retrieved from the database server, based on the field value stored by the client computer and on whether the retrieved batch of database records comprises a null value.

19. The system of 18, wherein the field value is a maximum field value and the batch of records to be retrieved comprises at least one record having a field entry that is greater than the field value when the batch of records are arranged in ascending order.

20. The system of claim 18, wherein the field value is a maximum field value and the batch of records to be retrieved comprises at least one record having a field entry that is greater than the field value when the batch of records are arranged in descending order.

21. The system of claim 18, wherein the field value is a minimum field value and the batch of records to be retrieved comprises at least one record having a field entry that is less than the field value when the batch of records are arranged in descending order.

22. The system of claim 18, wherein the field value is a minimum field value and the batch of records to be retrieved comprises at least one record having a field entry that is less than the field value when the batch of records are arranged in ascending order.

23. The system of claim 18, wherein the web server does not maintain a record of the user's state within the database table.

24. The system of claim 18, wherein the database server does not maintain a record of the user's state within the database table.

25. The system of claim 18, wherein the database server does not create a partitioned database.

26. The system of claim 18, wherein the client computer does not maintain a record of the user's state within the database table.

27. The system of claim 18, wherein the at least one field value comprises a reference value for a string contained in the retrieved batch of database records and wherein the batch of records to be retrieved from the database server comprises an adjacent batch of records.

28. A computer-readable medium having computer-executable instructions for performing steps comprising:

receiving a request for a first batch of records from a database table on a database server;

retrieving the first batch of record from the database server;

determining a minimum value and a maximum value for at least one field in the first batch of records;

receiving a request for a second batch of records; and making a determination as to which records in the database server to retrieve, based on the maximum value or the minimum value and on whether the second batch of records comprises a null value.

29. The computer-readable medium of 28, wherein the step of making a determination as to which records in the database server to retrieve does not require the database server to maintain a record of the first batch of records retrieved from the database table.

30. The computer-readable medium of 28, wherein the step of making a determination as to which records in the database server to retrieve comprises:

in response to a determination that the request for the second batch of records is a next request and that the second batch of records are arranged in ascending order, retrieving the second batch of records from the database server such that the second batch contains a value for the at least one field that is greater than the maximum value of the at least one field in the first batch of records;

in response to a determination that the request for the second batch of records is a next request and that the second batch of records are arranged in descending order, retrieving the second batch of records from the database server such that the second batch contains a value for the at least one field that is less than the minimum value of the at least one field in the first batch of records;

in response to a determination that the request for the second batch of records is a previous request and that the second batch of records are arranged in ascending order, retrieving the second batch of records from the database server such that the second batch contains a value for the at least one field that is less than the minimum value of the at least one field in the first batch of records; and in response to a determination that the request for the second batch of records is a previous request and that the second batch of records are arranged in descending order, retrieving the second batch of records from the database server such that the second batch contains a value for the at least one field that is greater than the minimum value of the at least one field in the first batch of records.

31. The computer-readable medium of 28, wherein the database server does not create a partitioned database.

32. The computer readable medium of claim 28, wherein at least one of the maximum value and the minimum value comprises a null value.

33. A computer-readable medium having computer-executable instructions for performing steps comprising:

receiving a request for a first batch of records from a database table on a database server;

retrieving the first batch of record from the database server;

determining a minimum value and maximum value for at least one field in the first batch of records;

receiving a request for a second batch of records;

in response to a determination that the request for the second batch of records is a next request and that the second batch of records are arranged in ascending order, retrieving the second batch of records from the database server such that the second batch contains a value for the at least one field that is greater than the maximum value of the at least one field in the first batch of records;

in response to a determination that the request for the second batch of records is a next request and that the second batch of records are arranged in descending order, retrieving the second batch of records from the database server such that the second batch contains a value for the at least one field that is less than the minimum value of the at least one field in the first batch of records;

in response to a determination that the request for the second batch of records is a previous request and that the second batch of records are arranged in ascending order, retrieving the second batch of records from the database server such that the second batch contains a value for the at least one field that is less than the minimum value of the at least one field in the first batch of records; and in response to a determination that the request for the second batch of records is a previous request and that the second batch of records are arranged in descending order, retrieving the second batch of records from the database server such that the second batch contains a value for the at least one field that is greater than the minimum value of the at least one field in the first batch of records.

* * * * *

UNITED STATES PATENT AND TRADEMARK OFFICE
CERTIFICATE OF CORRECTION

PATENT NO. : 6,789,085 B2
DATED : September 7, 2004
INVENTOR(S) : James Sturms

It is certified that error appears in the above-identified patent and that said Letters Patent is hereby corrected as shown below:

Title page,
Item [56], References Cited, U.S. PATENT DOCUMENTS, insert
-- 5,826,253   10/1998   Bredenberg         707/2
   6,125,360   09/2000   Witkowski et al.   707/2
   6,178,425   01/2001   Brodersen et al.   707/101
   6,233,584   05/2001   Purcell            707/103 --.

Column 10,
Line 22, delete "Current_Minimum ID_stored" and insert -- Current_Minimum_ID stored --, therefore.

Column 14,
Line 8, after "Table.Field1" insert -- = --.

Column 16,
Line 20, delete "18" and insert -- claim 18 --.

Column 17,
Line 44, delete "28" and insert -- claim 28 --.

Signed and Sealed this

Sixteenth Day of August, 2005

JON W. DUDAS
*Director of the United States Patent and Trademark Office*